Aug. 23, 1932.  O. G. SIMMONS  1,873,158
HOBBING CUTTER AND METHOD OF MAKING SAME
Filed April 22, 1929  3 Sheets-Sheet 2
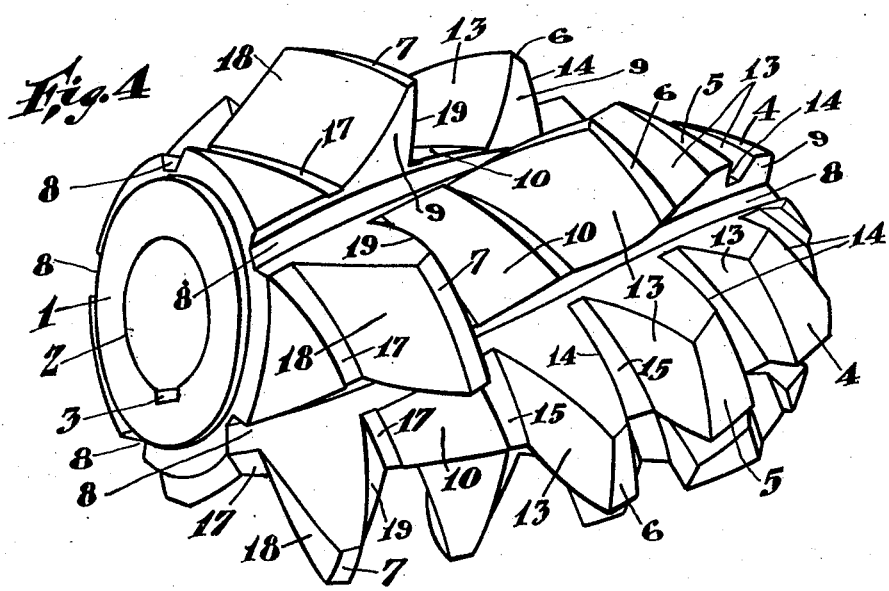
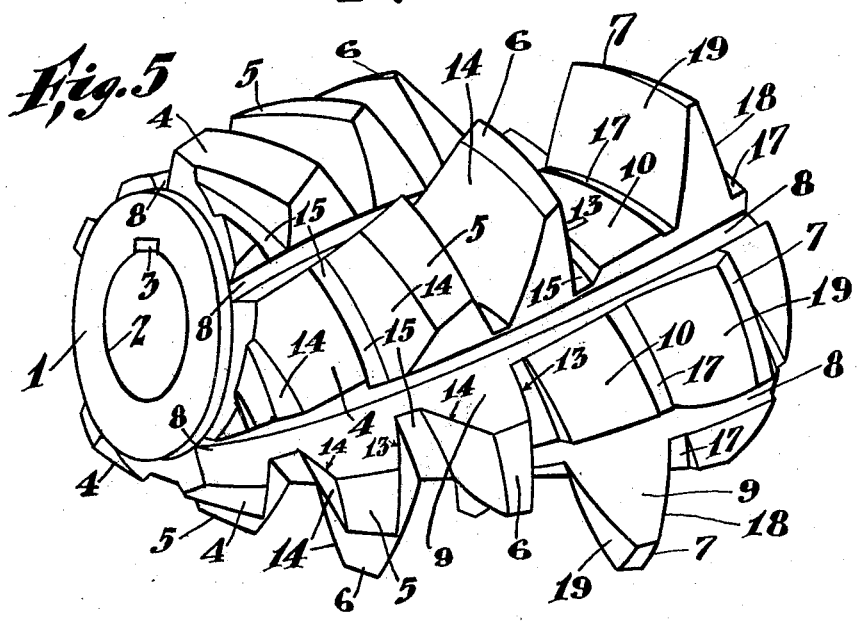
INVENTOR:

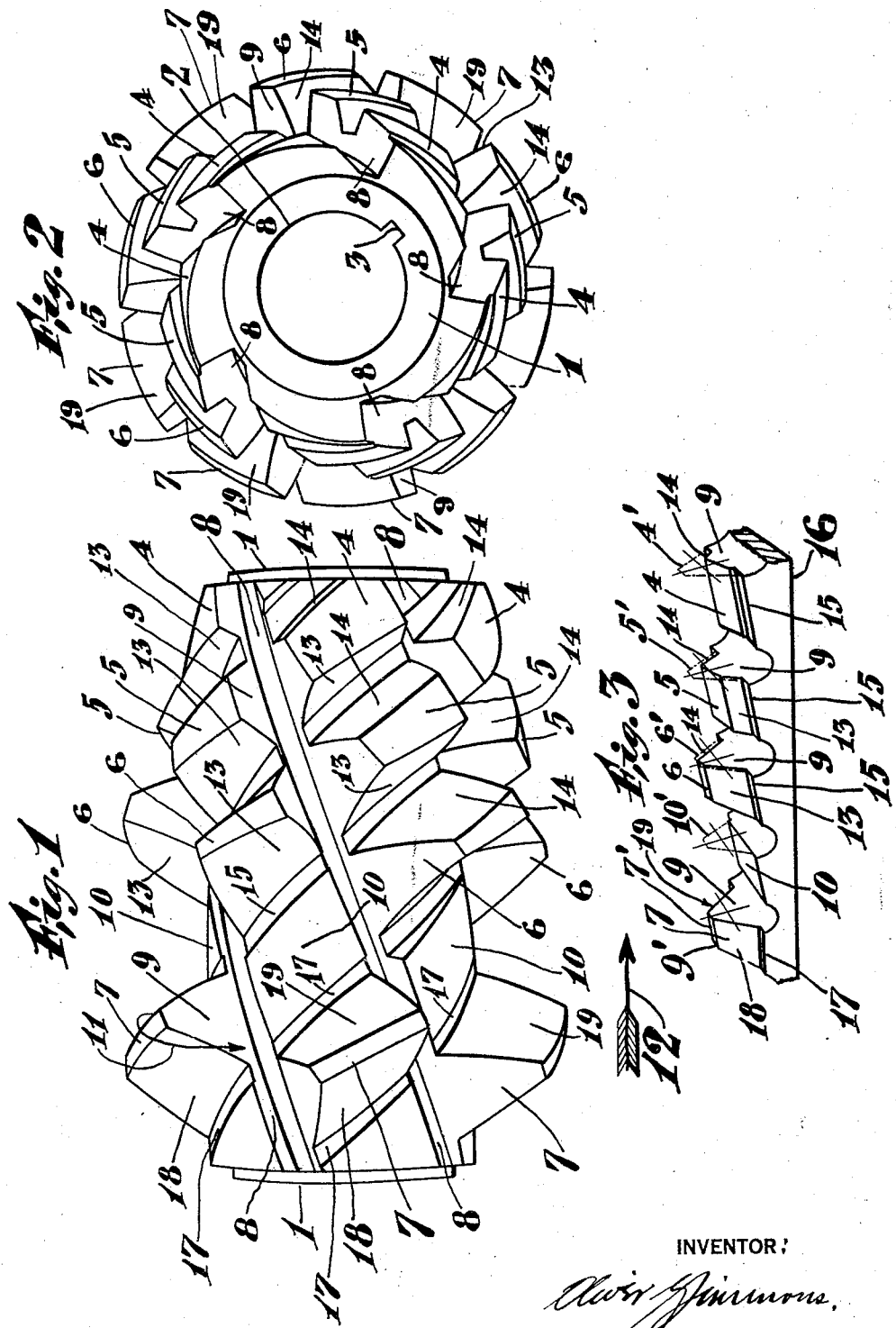
Aug. 23, 1932.   O. G. SIMMONS   1,873,158
HOBBING CUTTER AND METHOD OF MAKING SAME
Filed April 22, 1929   3 Sheets-Sheet 1
INVENTOR:

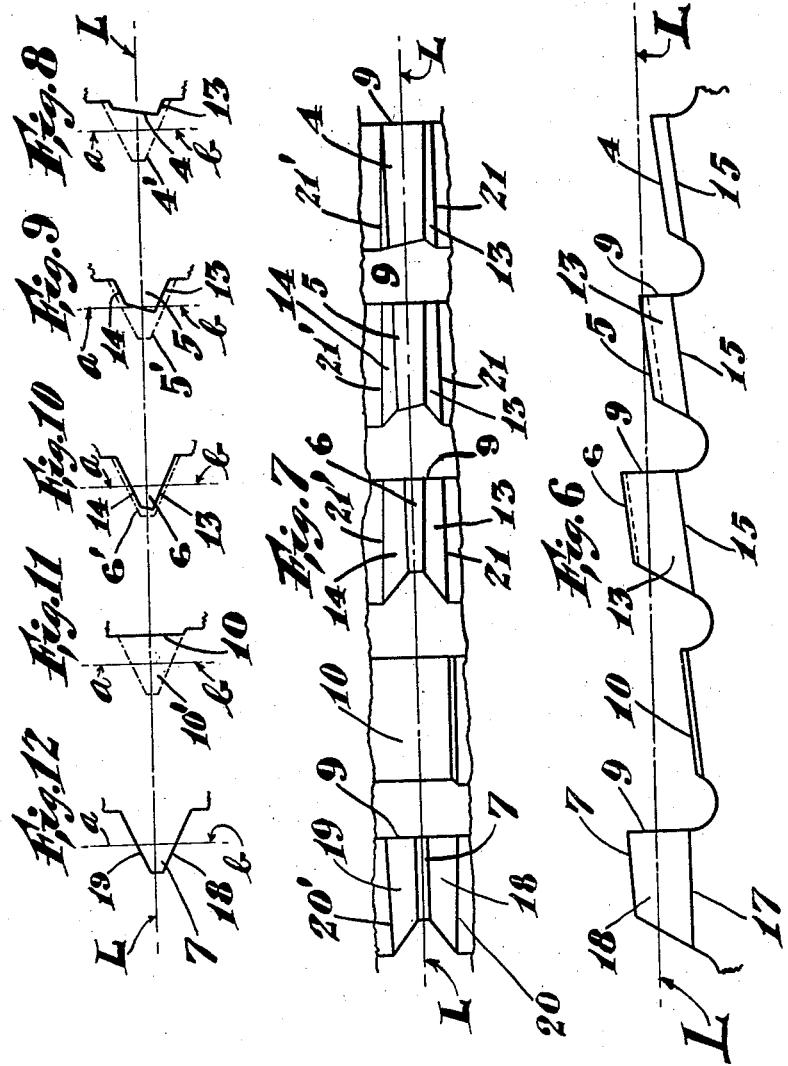

Patented Aug. 23, 1932

1,873,158

UNITED STATES PATENT OFFICE

OLIVER G. SIMMONS, OF LAKEWOOD, OHIO

HOBBING CUTTER AND METHOD OF MAKING SAME

Application filed April 22, 1929. Serial No. 357,002.

This invention relates to a hobbing cutter and method of making same for generating the teeth of worm wheels and the like.

An object of the invention is to provide a hob in which one end portion is provided with edged cutting teeth, the other end portion being also provided with edged cutting teeth, the method of relieving the last mentioned teeth being different from the method of relieving the first mentioned cutting teeth.

Another object of the invention resides in the method and means by which a cutter for hobbing worm wheels and the like, when caused to rotate and be fed tangentially across the throated face of a worm wheel or the like which is also rotating, will gradually begin to generate conjugate teeth in the work referred to and as the rotary movement and the feed movement is continued, will cause the teeth in the work to become deeper and more nearly to the finished condition at which time the cutter will cease to cut, but the movements of the cutter and the rotary movement of the work will continue through this period, thus relieving the cutting apparatus of all stress; the movements aforesaid continuing, the cutter will finally pass through this non-cutting period and begin to again cut the teeth in the work to finish same as it passes through.

An object of the invention resides in providing a hob having a series of roughing teeth preceding the finishing teeth, the roughing teeth of which are tapered in height from one end to the other and are radially relieved, the sides of which teeth are further tapered from back to front and the leading cutting edge of the teeth of which are the shallowest and thinnest, successive cutting teeth becoming thicker and of greater length radially of and toward the other end of the hob.

Another object of the invention resides in the side relieving the finishing teeth from front to back to taper same and of radially relieving the top of the finishing teeth to produce a constant pitch line tooth thickness.

With the above and other objects in view the invention comprises broadly the method and the embodiment of the method and means attained by the structure illustrated in the accompanying drawings hereinafter described and particularly set forth in the appended claims, together with such variations and modifications thereof as will be apparent to those skilled in the art to which the invention appertains. Reference should be had to the accompanying drawings forming a part of this specification.

Fig. 1 is a side elevation in perspective of a hobbing cutter.

Fig. 2 is an end view of Fig. 1, looking at the hobbing cutter from the right hand end of the person viewing the drawing.

Fig. 3 is a perspective view of the development of the roughing and finishing teeth of the cutter as they would appear if unwrapped from the cylindrical body portion of the hobbing cutter.

Fig. 4 is a perspective view of the hobbing cutter, the finishing end teeth being nearest to the observer.

Fig. 5 is a perspective view of the hobbing cutter similar to Fig. 4, except that the hobbing cutter has been turned around, in which the roughing teeth of the hobbing cutter are now nearest to the observer.

Fig. 6 is a side elevation on a reduced scale of the development of the teeth of the hobbing cutter, as they appear when unwrapped from the cylindrical body of same.

Fig. 7 is a plan view of Fig. 6.

Fig. 8 is a face elevation on a reduced scale of the first roughing tooth of the hobbing cutter.

Fig. 9 is a face elevation on a reduced scale of another roughing tooth of the hobbing cutter.

Fig. 10 is a face elevation on a reduced scale of still another roughing tooth of the hobbing cutter.

Fig. 11 is a face elevation on a reduced scale representing the last roughing tooth which has been removed to provide a non-cutting space.

Fig. 12 is a face elevation on a reduced scale of the finishing teeth.

Referring to Figs. 1 and 2, the numeral 1 indicates the body portion of the hobbing cutter which is provided with the bore 2 and keyway 3 which adapts the hobbing cutter to be firmly secured to an arbor in a suitable hobbing machine.

The first roughing tooth of this hobbing cutter is indicated by the numeral 4, the second roughing tooth by the numeral 5 and the third roughing tooth by the numeral 6. The finishing tooth is indicated by the numeral 7. This hob is further provided with the spiral gashes 8.

The hob shown in the drawings, Figs. 1, 2, 4 and 5, is known as a five-start hob, equivalent in effect to a multiple threaded worm of five threads. It is therefore preferable to provide a multiple number of gashes 8 corresponding to the number of starts in the hob, which is described as five. In like manner, if an eight-start hob were desired there would be preferably eight gashes, and, in a similar manner, if the hob desired contained seven starts, corresponding to a worm of seven threads, there would be preferably seven gashes in the hobbing cutter. This makes possible the arrangement of the roughing and finishing teeth indicated by the numerals 4, 5, 6 and 7, and represents in the preferred aspect of my invention the complete cycle of teeth in the hobbing cutter necessary to completely generate the corresponding conjugate space between adjacent teeth in the worm wheel. It will be obvious, however, that as the hobbing cutter is rotated with the worm wheels, it is possible that every tooth in the hobbing cutter will ultimately have entered and helped to generate the conjugate space between every adjacent tooth in the wheel. This is dependent upon the number of teeth in the worm wheel and will occur when the teeth in the worm wheel are not factorable with the number of starts in the hob.

The radial gashes 8 of the hobbing cutter are of such lead as will bring the radial face 9 of the teeth normal to the thread helix at the pitch line of the hob. The space 10 in the hob is obtained by removing a tooth to provide a non-cutting space between the end of the roughing teeth and the row of finishing teeth for a purpose to be later described.

In a suitable machine; for example, the machine referred to in applicant's companion application, Serial No. 536,458 filed May 11, 1931; a hobbing cutter of this character may be used to generate the teeth in the worm wheel through correlated rotary motion in the direction of the arrow 11 and rectilinear motion in the direction of the arrow 12, Fig. 1.

The action of generating conjugate teeth in the worm wheel by the cutter of the present invention, involves but a single pass of this type of cutter through the work, to finish generate all of the teeth without recourse being necessary to subsequent second or third passes or cuts. This is made possible by virtue of the arrangement and disposition of the roughing teeth referred to with respect to the finishing teeth.

Let it be assumed the hob is rotated in the direction of the arrow 11 and simultaneously moving in a rectilinear line in the direction of the arrow 12; this linear movement being a feed movement of the hob. The linear movement is relatively slow, whereas the rotary movement of the hob in the direction of the arrow 11 is relatively fast, in accordance with the ability of the cutting edge of the hob to maintain its keenness, thus the hobbing cutter is slowly fed through the work, having been positioned to cut to the full depth of tooth in the work. The work rotating in the proper direction at a speed correlated with respect to the rotary and rectilinear movements of the hobbing cutter. The tooth 4, being shorter and narrower than the teeth following, will generate its necessary conjugate groove; this is followed by the tooth 5 which is wider and higher, which will in turn generate its deeper and wider conjugate groove in the work; this is followed by the roughing tooth 6 of the hobbing cutter which is higher and wider than the preceding roughing teeth, thus generating the conjugate space between the teeth of the work of greater depth and width.

The movements of the hob and work are continued and as the final roughing tooth 6 gradually moves away from cutting contact with the work, the final finishing tooth 7, being slightly higher and wider, begins to contact and to operate to finish cut and generate its conjugate form in the teeth of the work. Between the final roughing tooth 6 and the finishing tooth 7, is a space indicated by the numeral 10, during the pass of which, through the work, no cutting action takes place, with the result the machine is relieved of all stress from the roughing cut before the finishing tooth 7 begins to operate to cut away metal, thus the machine is in the neutral state, in so far as spring is concerned and not under any stress during the pass of the finishing tooth except that introduced by the light finishing cut taken by the tooth 7. One pass of this hob through the work, therefore, is all that is necessary to complete the cutting operation of generating the conjugate teeth in a worm wheel or the like.

For this reason this hob is peculiarly adapted to work in an automatic machine of the type previously referred to, to finish cut the teeth of worm wheels and the like in one operation. Worm wheels of this type are used on the rear axle of automobiles, speed reducers, and other forms of speed reducing devices.

Referring to Figs. 4 and 5 the roughing teeth and the finishing teeth are clearly shown. The illustration of the roughing teeth 4, 5 and 6 clearly indicate the conical tapering of the top of the teeth 4, 5 and 6 which are further provided with radial relief, on a taper, as shown, to vary the height from the base of said teeth. These teeth are further made of varying thicknesses.

This is accomplished by gearing up a suitable hob relieving machine to provide the left hand sides 13 of the roughing teeth 4, 5 and 6 with a helicoidal surface having a lead slightly greater than the theoretical lead of the hob. In like manner, the sides 14 of the roughing teeth 4, 5 and 6, are provided with a helicoidal surface and with a lead slightly less than the theoretical lead of the hob.

By gearing up the hob relieving machine as described, with two different leads, first one then the other, the roughing teeth 4, 5 and 6 will vary in thickness as shown in Fig. 3 in which the dotted lines 4', 5' and 6' indicate the normal thickness of the teeth of the hob when the machine is geared up with the actual theoretical lead required to generate the teeth, but owing to the fact that the side 13 is geared up for a lead greater than the theoretical lead required, and the side 14 is geared up for a lead less than the theoretical lead required, the resultant tooth 6 is narrower than the required tooth thickness and the tooth 5 is narrower than the tooth 6, and, in like manner, the tooth 4 is narrower than the tooth 5, as shown in Fig. 3.

The radially relieved bottoms of the roughing teeth 4, 5 and 6, indicated by the numeral 15, in Fig. 3 are disposed at an angle to the base 16 of the teeth.

The tops of the teeth 4, 5 and 6 are obtained as described by tapering the end of the hob in the form of a cone, and then radially relieving them. The narrowing up of the teeth 4, 5 and 6 is, therefore, obtained, as described, by using a long and short lead, and the radial relief of the bottoms 15 provides the necessary clearance for the cutting face 9 of the hobbing cutter.

The bottoms of the finishing teeth 7, however, are not radially relieved. The bottom of this tooth indicated by the numeral 17, as illustrated, is parallel to the base 16. The cutting edge 9 is obtained in this tooth by helically tapering the tooth from front to back on each side of the finishing teeth to provide the proper amount of clearance on the helicoid sides 18 and 19. This is accomplished by gearing up a suitable machine with a short lead to produce the helicoid side 18 and with a long lead to produce the helicoid side 19.

The tops 7' of the teeth 7 are then relieved radially to give the proper tooth thickness at the same height from the front edge 9 of the hob to the back edge 9'. By making the finishing teeth as described I have found in practice that a side clearance on the sides of the teeth 18 and 19 of the finishing teeth 7, of substantially 2° from front to back, will provide ample clearance and at the same time a very small radial relief is required to produce the radial relieved surface 7' on a very slight angle so that as the faces 9 of the teeth are ground to sharpen same, the diameter of the hob is reduced very little at the finishing end. This is very important because, manifestly, the hob must at all times be not less in diameter than the worm which will mesh with the finished worm wheel, and at the same time the hob diameter must not exceed that of the worm diameter by any appreciable amount in the interest of efficiency. For example, if the hobbing cutter were very much larger than the worm, and used to cut a worm wheel to mesh with the worm, the worm would have very little bearing lengthwise of the teeth of the worm wheel, whereas, if the hobbing cutter is more nearly to the size of the worm, the bearing will extend further across the teeth of the worm wheel.

Hobs of the prior art are provided with radial clearance only, and require a radial clearance angle of anywhere from 10° to 25°, which obviously indicates that with the old radial relieved hobs we were compelled in the shop to start out with a new hob very much oversize, whereas, with a hob made in accordance with this invention, the finishing teeth have approximately a 2° side clearance angle with a corresponding relief angle for the top of the finishing tooth in the neighborhood of approximately 4° to 5°. This enables worm wheels to be cut throughout the entire life of the hob and to have more nearly full line contact lengthwise of the tooth of the worm wheel with its worm.

The cutting clearances given to the teeth of the cutter of the present invention are illustrated in Figs. 6 to 12 inclusive.

With reference to Fig. 6 it will be noted that the roughing teeth 4, 5 and 6 are provided with the radial relief 15 and that the roughing teeth vary in height. The line L—L, which is the theoretically correct lead line, would be straight in this development, as illustrated. This line is again illustrated in Fig. 7 and again in Figs. 8 to 12 inclusive.

The line $ab$, Fig. 8, represents the pitch circle in its straight line development, and this applies also to Figs. 9 to 12 inclusive.

In Fig. 6, following the roughing tooth 6, is clearly illustrated the non-cutting space 10 which is followed by the finishing tooth 7, which is provided, as previously stated, with the side relief 20, which as noted is at an angle to the line L—L to provide the required clearance to the side 18 of the finishing tooth 7, back of the cutting edge 9.

In like manner, the side 19 of the finishing tooth 7 is provided with the side clearance 20' to provide clearance for the cutting edge 9 of the tooth 7. The root 17 of the tooth 7, therefore, in Fig. 6, will be parallel to the line L—L and the top of the tooth 7 being provided with radial relief will be at an angle thereto.

The angle of side clearance 20, as previously stated, is obtained by using a shorter lead than the theoretical lead, and, in a similar manner, the side clearance 20' is obtained by using a greater lead than the theoretical lead. This condition is reversed with respect to the roughing teeth 4, 5 and 6 in which the sides 13 of the roughing teeth are radially relieved and the lead 21 is used which is slightly greater than the theoretically correct lead of the hob which is indicated by the line L—L and the opposite sides 14 of the roughing teeth are in turn radially relieved, using the lead 21' slightly less than the theoretical lead L—L of the hob.

The lead lines 20 and 20' of the finishing tooth 7 are at substantially equally opposed angles to the theoretical line L—L, and, in like manner, except in the reverse order, the lead lines 21 and 21' of the roughing teeth are at substantially equal angles but opposed to each other with respect to the theoretical line L—L.

An elevational view of each tooth is shown, in Figs. 8 to 12 inclusive, in which figures are illustrated the theoretical form of the tooth by dot and dash line, and indicated by the numerals 4', 5' and 6' with reference respectively to the roughing teeth 4, 5 and 6, and the numeral 10' indicates the tooth by dot and dash line, which would ordinarily appear if the space 10 had not been provided.

The pitch line $ab$ intersects the theoretical lead line L—L at substantially the same point on the finishing tooth 7 as well as the theoretical teeth 4', 5', 6' and 10', but owing to the long and short leads as heretofore referred to, the roughing tooth 4 will be narrower than the roughing tooth 5, and, in like manner, the roughing tooth 5 will be narrower than the roughing tooth 6, the finishing tooth 7 being of the correct height and width. The tooth which would otherwise appear in Fig. 11 being removed, will provide the space 10.

In Figs. 8, 9 and 10 the tops of the teeth are at an angle with respect to the pitch line $ab$, the tooth 4 being lower than the tooth 5, and the tooth 5 being lower than the tooth 6, as measured from the base of the teeth. Thus the top of tooth 4 is considerably below the pitch line $ab$, whereas the top of tooth 5 approximately intersects the pitch line $ab$ and the lead line L—L, whereas the top of tooth 6 is located outside of the line $ab$ substantially as shown.

The dotted lines of the teeth in Figs. 8 to 11 inclusive correspond substantially to the dotted lines of the teeth shown in Fig. 3.

Having thus described my invention, I claim:

1. A hob having cutting teeth arranged in a helical row, a tooth at one end of said row being a finishing tooth and the other teeth being roughing teeth smaller than the finishing tooth and gradually decreasing in size toward the opposite end, said roughing teeth having radial relief and the sides of said finishing tooth having helical side relief and top radial relief, the angle of relief of the finishing tooth being small as compared to the angle of relief of the roughing teeth.

2. A hob having cutting teeth arranged in a helical row, a tooth at one end of said row being a finishing tooth and the other teeth being roughing teeth smaller than the finishing tooth and gradually decreasing in size toward the opposite end, the opposite side faces of the roughing teeth lying in longitudinally converging helicoid surfaces and the side faces of the finishing tooth lying in oppositely converging helicoid surfaces.

3. An integral one-piece hob having generated peripheral cutting teeth arranged in a plurality of helical rows, the teeth of each row gradually decreasing in size toward one end of the hob, the largest tooth of each row being a finishing tooth, the other teeth being roughing teeth, said roughing teeth having radial relief and said finishing teeth having side relief and top radial relief, the angle of relief of the finishing tooth being small as compared to the angle of relief of the roughing teeth.

4. A hob having cutting teeth arranged in a plurality of helical integral rows, the teeth of each row gradually decreasing in height and thickness toward one end of the hob, the top faces of the teeth being radially relieved, an end tooth of each integral row being a finishing tooth and having helicoid side faces converging in the direction away from the cutting edges thereof.

5. An integral one-piece hob having cutting teeth generated on the periphery thereof arranged in a plurality of helical rows spaced circumferentially of the hub, said teeth having side faces forming sides of helicoidal grooves which gradually increase in width toward one end of the hob and end faces forming sides of helicoidal gashes normal to said grooves, said grooves and gashes extending the full length of the hob the teeth gradually decreasing in height toward the above mentioned end of the hob, said teeth having cutting edges at the ends thereof toward the small end of the hob, the tooth at the opposite end of each row being a finishing tooth and having side faces converging in a direction away from the cutting edges thereof.

6. A hob having circumferentially spaced finishing teeth at one end and roughing teeth spaced axially with respect to the finishing teeth, a plurality of roughing teeth being in helical alinement with each finishing tooth, the roughing teeth of each helical row being smaller than the finishing tooth with which they are alined and of gradually decreasing height and thickness toward the opposite end of the hob, each finishing tooth being spaced from the adjacent roughing tooth of the same helical row a distance substantially double the space between the adjacent roughing teeth in said row.

7. A hob having circumferentially spaced finishing teeth at one end and roughing teeth spaced axially with respect to the finishing teeth, the roughing teeth being of less height and thickness than the finishing teeth and each roughing tooth being helically alined with a finishing tooth, the peripheral faces of the roughing teeth having radial relief, and the finishing teeth having side faces provided with a small angle of relief and peripheral faces having radial relief at an angle much smaller than the angle of radial relief of the roughing teeth.

8. An integral one-piece hob having a group of circumferentially spaced finishing teeth at one end, each of which has helicoidal side faces which converge at a small angle toward said end of the hob and cutting edges at the large end thereof, and a group of roughing teeth spaced axially with respect to said group of finishing teeth, said roughing teeth being of a height and thickness less than that of the finishing teeth, each roughing tooth having its cutting edges in helical alinement with the cutting edges of one finishing tooth and its end faces in helical alinement with the end faces of another finishing tooth.

9. A hob having a group of circumferentially spaced finishing teeth at one end, each of which has helicoidal side faces which converge at a small angle toward said end of the hob and cutting edges at the large end thereof, and a group of roughing teeth spaced axially with respect to said group of finishing teeth, said roughing teeth being of a height and thickness less than that of the finishing teeth, a plurality of roughing teeth being alined helically with each finishing tooth, the teeth of each helical row gradually decreasing in height and thickness in the direction away from the finishing teeth, each finishing tooth being spaced from the adjacent roughing tooth alined helically therewith a distance substantially double that between adjacent roughing teeth in the same row.

10. A hob having cutting teeth disposed in a series of helical rows equally spaced circumferentially of the hob, said teeth having side faces separated by helicoidal grooves increasing in width toward one end of the hob and end faces separated by helicoidal gashes normal to said grooves and extending the full length of the hob, of a number equal to the number of grooves and equally spaced circumferentially of the hob, said teeth having radially relieved top faces and being of gradually decreasing height toward the above mentioned end of the hob.

11. A hob having cutting teeth disposed in a series of helical rows equally spaced circumferentially of the hob, said teeth having side faces separated by helicoidal grooves increasing in width toward one end of the hob and end faces separated by helicoidal gashes normal to said grooves and extending the full length of the hob, of a number equal to the number of grooves and equally spaced circumferentially of the hob, said teeth having cutting edges at the ends thereof toward the above mentioned end of the hob and being of gradually decreasing height toward said end, teeth at the end of the hob opposite that above referred to having side relief and the smaller teeth having radial relief.

12. The herein described method of making a hob which consists in forming longitudinally tapering helical threads on a blank by cutting regularly spaced helical grooves therein which are gradually widened toward one end of the blank, forming spaced cutting teeth along the length of each thread by cutting gashes across the threads substantially normal thereto and throughout the length of the blank, radially relieving the top surfaces of the teeth, and relieving the side faces of the tooth formed at the wide end of each thread.

13. The herein described method of making a hob which consists in forming longitudinally tapering helical threads on a blank by cutting regularly spaced helical grooves therein which are gradually widened toward one end of the blank, forming spaced cutting teeth along the length of each thread by cutting gashes across the threads substantially normal thereto, radially relieving the top surfaces of the teeth, relieving the side faces of the tooth formed at the wide end of each thread, and removing the tooth next adjacent each of the last mentioned teeth.

14. The herein described method of making a hob which consists in forming longitudinally tapering helical threads on a blank by cutting regularly spaced helical grooves therein which are gradually widened toward one end of the blank, forming spaced cutting teeth along the length of each thread by cutting gashes across the threads substantially normal thereto and throughout the length of the blank, cutting away portions of the tops of the teeth to provide teeth having radially relieved top faces and of gradually decreasing height from the wide to the narrow end of each thread, and relieving the side faces of the tooth formed at the wide end of each thread.

15. The herein described method of making a hob which consists in forming longitudinally tapering helical threads on a blank by cutting regularly spaced helical grooves therein which are gradually widened toward one end of the blank, forming spaced cutting teeth along the length of each thread by cutting gashes across the threads substantially normal thereto, cutting away portions of the tops of the teeth to provide teeth having radially relieved top faces and of gradually decreasing height from the wide to the narrow end of each thread, relieving the side faces of the tooth formed at the wide end of each thread and removing the tooth next adjacent each of the last mentioned teeth.

In testimony whereof I affix my signature.

OLIVER G. SIMMONS.